No. 653,840. Patented July 17, 1900.
G. H. BRABROOK.
JAR CLOSURE.
(Application filed Apr. 24, 1899.)
(No Model.)
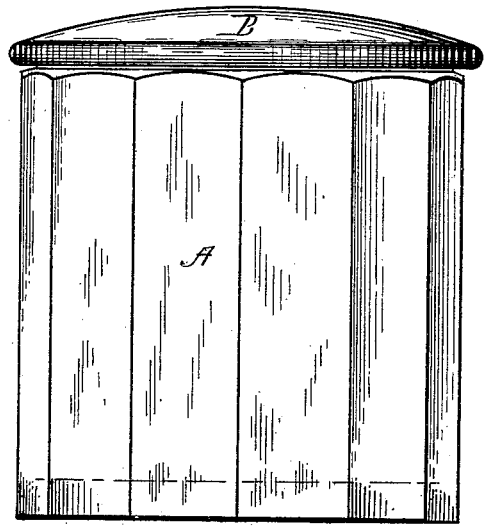
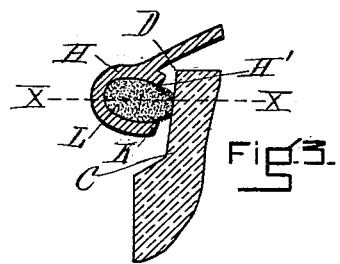
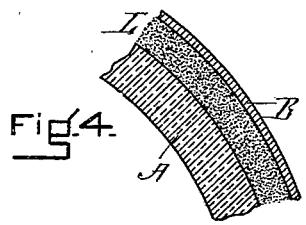
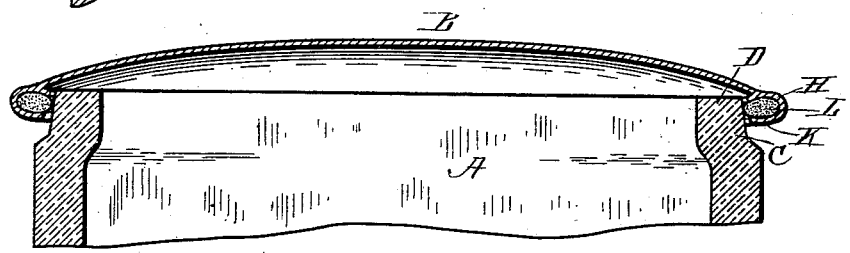
WITNESSES
INVENTOR

UNITED STATES PATENT OFFICE.

GEORGE HALE BRABROOK, OF TAUNTON, MASSACHUSETTS, ASSIGNOR TO THE REED & BARTON CORPORATION, OF SAME PLACE.

JAR-CLOSURE.

SPECIFICATION forming part of Letters Patent No. 653,840, dated July 17, 1900.

Application filed April 24, 1899. Serial No. 714,189. (No model.)

*To all whom it may concern:*

Be it known that I, GEORGE HALE BRABROOK, a citizen of the United States, residing at Taunton, in the county of Bristol and Commonwealth of Massachusetts, have invented a new and useful Improvement in Jar-Closures, of which the following is a full specification.

My invention relates to a device for the air-tight closure of jars of the class that require to be frequently opened and closed for the purpose of refilling the jar or for getting access to its contents and partially or entirely removing the same.

The objects are to so make the closing device that it may be easily put on or taken off and be comparatively air-tight; also, to so arrange the gasket-holding device that the gasket may be readily detached from its holder and a new one put in its place when it becomes defective or in any manner unfit for use. These objects I attain by the construction shown in the accompanying drawings, in which—

Figure 1 shows one of my jars in elevation. Fig. 2 shows in vertical section the upper part of a jar and the cover and closure device. Fig. 3 shows in vertical section, enlarged, a part of the neck of the jar and a part of the cover and serves to illustrate the arrangement of the gasket and the manner of holding it. Fig. 4 is a horizontal section taken on line X X of Fig. 3.

The body of this jar may be made of any desired size and shape and of metal, glass, earthen, or other suitable material. The exterior surface of the neck of the jar should be comparatively smooth and slightly coned, as indicated at C D, Figs. 2 and 3, so as to form a good bearing-surface for the gasket L.

The gasket L is preferably of cork, either cut from the natural bark or molded from ground cork, although it may be made from other material, such as soft leather, finely-made-up cord, or rubber and the like.

The cover B is formed with a depending annular flange, as shown, made wider than its height, and wherein is formed an annular seat or recess H K, oval shape in cross-section and having a contracted opening in its inner side the edges of which are indicated at H' K', so that when the gasket is arranged in the seat or recess a portion will project from the opening against the periphery of the neck of the jar and seal the cover on the jar. By making the annular recess in the form illustrated a secure holding and projection for the gasket is provided, from which it will not be displaced except as may be desired or required.

I claim—

A jar-closure, consisting of a cover formed with a depending annular flange wider than its height and having an oval recess formed in the flange provided with a contracted annular opening at its inner end, and an oval-shaped gasket seated in the recess with its inner portion protruding therefrom, substantially as shown and described.

In witness whereof I have hereunto set my hand.

GEO. HALE BRABROOK.

Witnesses:
A. H. FLANNERY,
G. W. PHILLIPS.